(12) United States Patent
Pirinoli

(10) Patent No.: US 7,078,719 B2
(45) Date of Patent: Jul. 18, 2006

(54) OPTICAL APPARATUS FOR MEASURING OBJECTS HAVING A RECTILINEAR PROFILE

(75) Inventor: Enrico Maria Pirinoli, Turin (IT)

(73) Assignee: Area Sistemi S.r.l., Turin (IT)

( * ) Notice: Subject to any disclaimer, the term of this patent is extended or adjusted under 35 U.S.C. 154(b) by 167 days.

(21) Appl. No.: 10/474,737

(22) PCT Filed: Apr. 5, 2002

(86) PCT No.: PCT/EP02/03797

§ 371 (c)(1),
(2), (4) Date: Jan. 14, 2004

(87) PCT Pub. No.: WO02/084214

PCT Pub. Date: Oct. 24, 2002

(65) Prior Publication Data

US 2004/0104360 A1    Jun. 3, 2004

(30) Foreign Application Priority Data

Apr. 11, 2001   (IT)   ............................ TO2001A0349

(51) Int. Cl.
*G01N 21/86* (2006.01)

(52) U.S. Cl. .................................. 250/559.36; 356/638
(58) Field of Classification Search ........... 250/559.36, 250/559.24, 559.12–559.15; 356/638
See application file for complete search history.

(56) References Cited

U.S. PATENT DOCUMENTS

| | | | |
|---|---|---|---|
| 3,947,129 A | | 3/1976 | Wiklund |
| 4,021,119 A | * | 5/1977 | Stauffer ...................... 356/638 |
| 4,744,654 A | * | 5/1988 | Jinno et al. ................. 356/73.1 |
| 4,872,757 A | * | 10/1989 | Cormack et al. ........... 356/612 |
| 5,608,530 A | | 3/1997 | Gates |

* cited by examiner

Primary Examiner—Thanh X. Luu
(74) Attorney, Agent, or Firm—Sughrue Mion, PLLC

(57) ABSTRACT

Apparatus for measuring an object (4) with at least one rectilinear edge or profile (4a, 4b) parallel to a given direction (y), comprising: a laser source (1) which emits radiation (2, 2a) which impinges on the said edge or profile; a first cylindrical converging lens (5) the directrices of which are parallel to the direction (y), disposed downstream of the object (4); a spatial filter (6) disposed in the focal plane (A) of the first converging lens (5); a second converging lens (7) disposed downstream of the spatial filter (6); and photosensors (8) disposed in the focal plant (F) of the second converging lens (7).

5 Claims, 2 Drawing Sheets

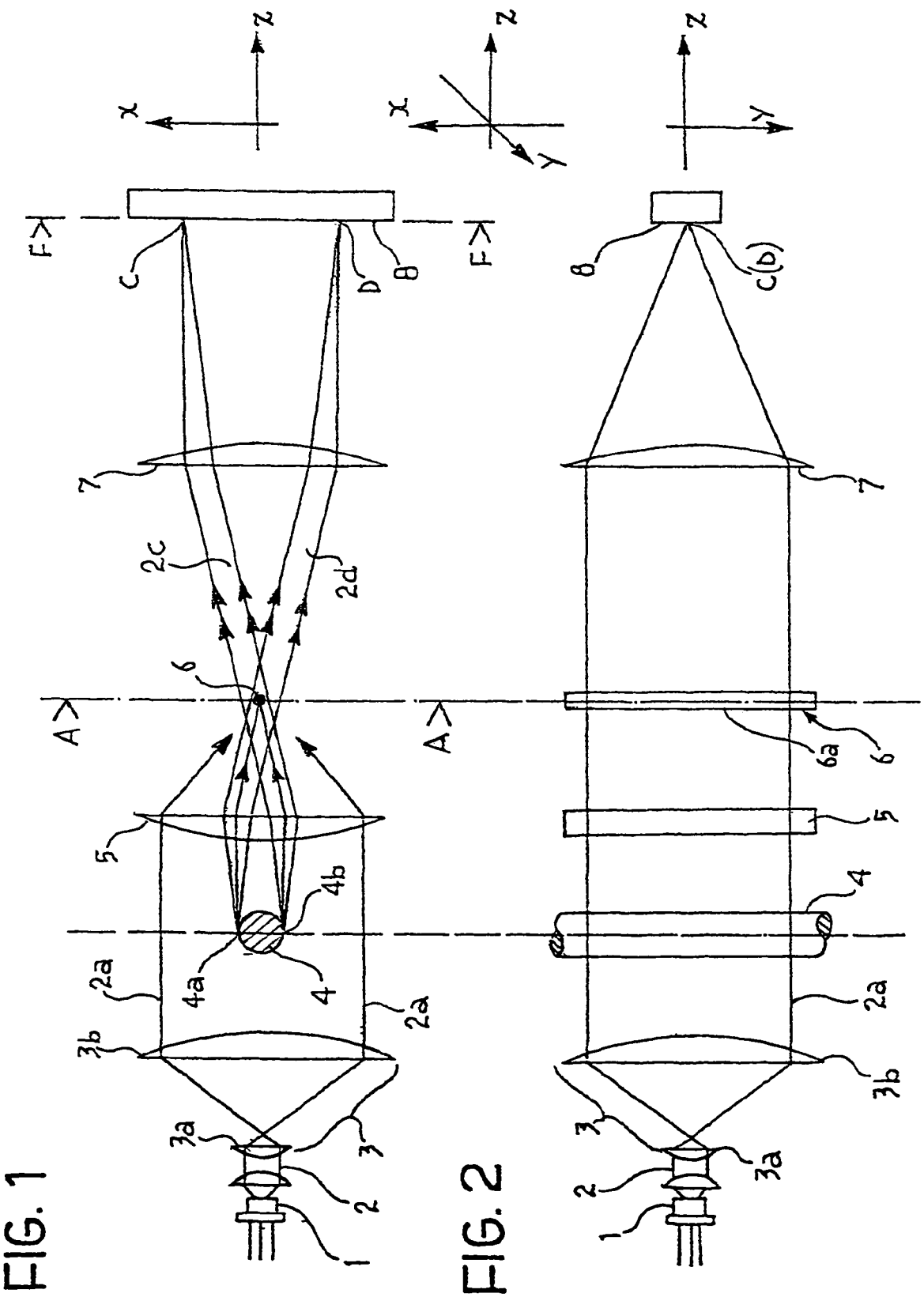

OPTICAL APPARATUS FOR MEASURING OBJECTS HAVING A RECTILINEAR PROFILE

This is a National Stage Entry of Application No. PCT/EP02/03797 filed Apr. 5, 2002; the disclosure of which is incorporated herein by reference.

BACKGROUND OF THE INVENTION

The present invention relates to optical apparatus for measuring objects having a rectilinear profile.

For a better understanding of the state of the art and its inherent problems, conventional apparatus, illustrated in FIGS. 3 and 4 of the attached drawings, which has been produced to study the behaviour of a generic two-dimensional shape in the laboratory will first be described.

In FIG. 3 a He—Ne tube laser 1 delivers a beam 2 of collimated coherent light of uniform light density with a high degree of coherence. The beam 2 is expanded by a beam expander 3 having a pin-hole filter and directed onto an opaque object 4 the geometric dimensions of which it is desired to measure. By the diffraction principle described by Fresnel and Fraunhofer, at the points of interaction of the light wavefront with the opaque object 4, that is to say along its edge or outline, there are formed new wavefronts of spherical type the radial components of which are divergent with respect to the direction of the original incident beam (FIG. 4).

At this level, if the image were to be analysed in detail, there would be observed, in correspondence with the enlarged outline of the object 4, a region of uncertainty created by thin "fringes" of alternating light and shade which would render it difficult or impossible to form an exact determination of the spatial position of the edge.

The light beam 2, after having encountered the object 4, arrives at a spherical converging lens 5 disposed orthogonally of the direction of the beam.

According to the laws of geometric optics, only and exclusively the parallel components (indicated 2a) of the incident radiation (FIG. 4) converge at the focal point of the lens 5. At the focus of the lens 5 is disposed an obstacle 6, such as, for example, an opaque spot, hereinafter called a "stop" or "spatial filter" which impedes the propagation of the light.

The function of the spatial filter 6 is to stop only the parallel components 2a of the incident beam without interfering with the divergent and diffracted components 2b of the beam which can reach a focusing and enlarging converging lens 7 and finally be collected on a screen or photo sensitive chamber 8. The resulting image on the screen 8, after the spatial filtering just described, is constituted exclusively by thin lines of light which correspond to the outline of the object 4 standing out on a dark background.

The contrast between the illuminated line (useful signal) and the residual background illumination (noise) is greater the more the coherent light source satisfies the initial requirements of spatial homogeneity and parallelism.

The image thus processed lends itself particularly well to electronic analysis for measurement of the object. In fact, whilst it is impossible to establish exactly a criterion with which to choose a reliable and repeatable preferential measurement point on an undefined light/shade edge (such as would be that of the image obtained without the spatial filter), it is relatively simple to measure the distance, on the screen 8, between spaced lines, each of which has a very narrow maximum of luminous intensity.

Examples of theoretical studies which represent the known technique discussed above are described in the following publications: H. Lipson and C. A. Taylor Fourier Transform and X-Ray diffraction, 1958; G. Harnburn, C. A. Taylor, T. R. Welberry *Atlas of Optical Transforms*, 1975; F. Docchio, E. Sardini, O. Svelto, A. Taroni *On-Line Dimensional Analysis of Surfaces Using Optical Filtering and Elaboration Techniques in the Fourier Plane*, 1989; and R. G. Wilson *Fourier Series and Optical Transform Techniques in Contemporary Optics*, 1995.

However, the results achieved experimentally have been obtained in a laboratory using sophisticated optical and electronic instrumentation, in conditions very close to the theoretical ideal, that is to say:

it was possible to have available a light source having a high degree of coherence, typically that delivered by a He—Ne tube laser;

it was possible to filter as much as necessary, and expand the laser beam in such a way that the resultant beam had a uniform luminous distribution and the rays were parallel to one another; in other words it was possible to obtain a beam free from spatial harmonic components and having a flat wavefront;

it was possible to use high quality lenses and optics, with very large apertures with respect to the dimensions of the object under observation.

Currently there are available on the market non-contact measurement devices (which utilise different principles from those described here) with which it is possible to obtain good measurement precision (typically 0.1 µm) but at high cost and with limited robustness of the instrument, or else, alternatively, to obtain economy but limited precision (typically not less than 5 µm).

SUMMARY OF THE INVENTION

It is the object of the present invention to provide improved measurement apparatus able to perform high precision measurements (0.5 µm or less).

Another object of the invention is to provide measurement apparatus of low cost and small dimensions which make it suitable for use in an industrial environment on a large scale. In particular, it is the object of the invention to provide reliable measurement apparatus in which the maintenance operations are reduced to the minimum and adjustment is simple.

A further object of the invention is to provide measurement apparatus able to obtain continuous measurement of the object, with a measurement limit better than that achieved with repeated scansions.

These and other objects and advantages, which will be better understood hereinafter, are achieved according to the present invention by apparatus having the characteristics defined in the attached claims. A preferred but non-limitative embodiment of apparatus according to the present invention will now be described making reference to the attached drawings, in which:

BRIEF DESCRIPTION OF THE DRAWINGS

FIG. 1 is a schematic side view of measurement apparatus according to the invention;

FIG. 2 is a schematic plan view of the apparatus of FIG. 1;

DETAILED DESCRIPTION OF THE INVENTION

In the explanatory views of FIGS. 1 and 2 the dimensions, proportions and shapes of the objects and the angles of divergence or convergence of the light rays are accentuated for clarity of explanation and are not shown to scale.

Figure 3:
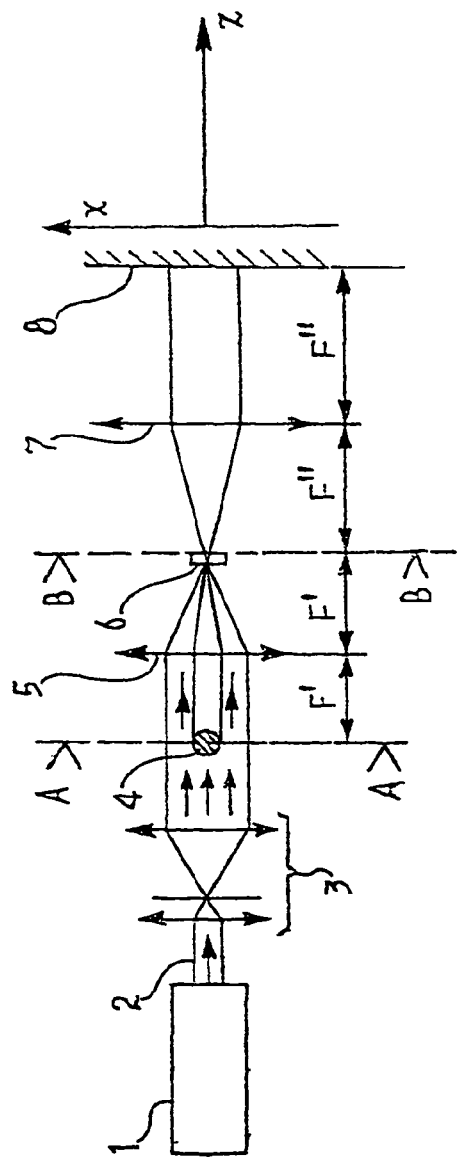
FIG. 3 is a schematic view of measurement apparatus of known type.
Figure 4:
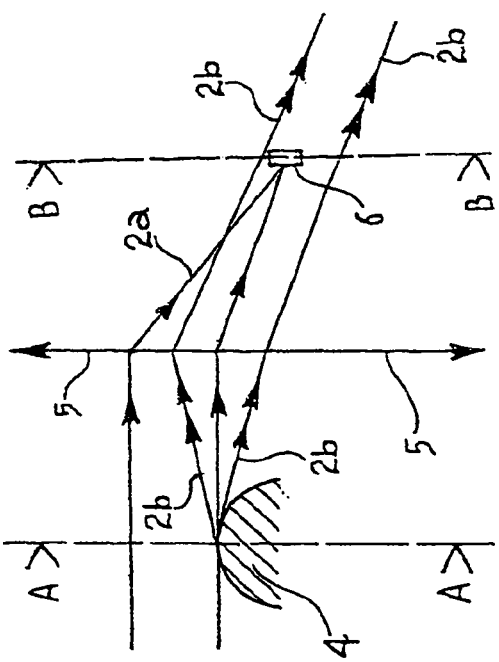
FIG. 4 is an enlarged view of a detail of FIG. 3.

Making reference now to FIGS. 1 and 2, and utilising for simplicity the same reference numerals already used in FIGS. 3 and 4 to indicate the same or corresponding parts and elements, the reference numeral 4 indicates an object to be measured, in this example a wire the diameter of which it is desired to measure.

Naturally, the reference to this possible field of application must not be interpreted in any way as limitative of the scope of the patent. In particular, the apparatus according to the present invention lends itself to obtaining:

measurement of the spatial position of a rectilinear edge (or outline or section) of a mechanical object, referred to a zero of the apparatus, or the relative distance between two or more rectilinear parallel edges of an object.

The invention can therefore be utilised for the measurement of a thread, yarn or wire, or a turned mechanical piece, or the position of the rectilinear edge of a sheet of opaque material (sheet metal, plastics laminate, paper etc.) or a rectilinear slot having parallel edges (the space between two pieces of sheet metal about to be welded) etc.

Given that the particular type of object which it is intended to measure is known a priori it is possible to introduce important simplifications to the optical structure designed for the extraction of the outline of the object, making the process less sensitive to possible inhomogeneities or disturbances, and applicable at the industrial level.

In FIGS. 1 and 2 is indicated a set of three orthogonal axes (x, y, z); the object 4 to be measured is disposed with its rectilinear parallel edges 4a, 4b orientated along the y direction, defined here as the longitudinal direction, for the purpose of measuring the diameter (or the spatial position) of the object 4 along the vertical x axis.

A light source 1 projects a collimated light beam 2 in the direction of the axis z, defined here as the transverse axis. The beam 2 is expanded by an expander 3 which does not have filters but includes a pair of lenses 3a, 3b to obtain an expanded light beam 2a orientated parallel to the transverse z axis and of width such as to embrace both the upper and lower outlines 4a, 4b respectively of the wire 4.

The expanded light beam 2a illuminates the wire 4 and a convergent lens 5 disposed downstream of this.

An important characteristic of the present invention is that the convergent lens 5 is of cylindrical type with its generatrices disposed parallel to the y axis. The lens 5, being of cylindrical type, produces not a point focus but a rectilinear one parallel to the longitudinal y axis. In the focal plane A of the lens 5 is disposed a spatial filter 6 of essentially linear form elongated in a direction parallel to the longitudinal y axis.

The spatial filter 6 may advantageously be constituted by a bar or by a calibrated wire the width of which in the x dimension is chosen in dependence on the specific requirements to obtain a good compromise between the capacity for obtaining a sufficiently well defined radiation which passes through the spatial filter and at the same time having a light intensity sufficient for the purpose of detection. This spatial filter can be advantageously fixed in a simple manner at its opposite ends to the apparatus. The spatial filter 6 can be made of any material; at least the surface 6a of the spatial filter facing the cylindrical lens 5 is opaque. For example the spatial filter 6 can be constituted by a black or blackened metal wire.

Preferably the wire 4 is situated at the front focal distance of the lens 5.

The adoption of a cylindrical converging lens 5 in place of a conventional spherical lens is advantageous in that it makes it possible to introduce significant improvements of a practical nature to the optical process of extraction of the outline of an image. The wave front of a collimated and expanded light beam 2a which illuminates the wire 4 is considered. Without wishing to be tied to any specific theory, the experiments conducted by the applicant show that, with respect to the conventional arrangements with spherical converging lenses, in the optical process of "extraction" of the outline of the object 4, the final image obtained with a cylindrical lens is less sensitive to possible inhomogineities present in the illumination wavefront, in that possible inhomogineities in the distribution of light along the longitudinal y axis, not being subjected to the effect of the lens 5 in the xz plane, do not increase the residual background illumination. This eliminates an important optical noise factor.

Therefore it is possible to use a source 1 of collimated light which is not ideal, such as a laser diode 1 of low power, for example about 3 mW, which typically has a non-uniform spatial light emission. Better results are obtained if the axis of polarisation of the electric field of the luminous radiation emanating from the laser diode 1 is orientated along the vertical x axis of the lens; in these conditions the minimum residual background noise and the maximisation of the useful signal is obtained.

From an industrial point of view it will be appreciated that the use of a laser diode in place of a tube laser source, as proposed in the cited publication of F. Docchio et al, drastically reduces the total cost and the overall dimensions of the apparatus.

It has been experimentally verified that due to the use of a cylindrical lens 5 the resultant signal-to-noise ratio in the extracted image is excellent even using a non-ideal light source (low power laser diode) and without using filters or particularly dedicated optics to render the light emission uniform.

Moreover, a spherical lens normally uses a point-like stop which makes it necessary for it to be mounted on a transparent support. This involves the disadvantages of a greater cost of production, the possibility of optical aberrations caused by the transparent support, possible accumulations of dirt on the transparent support, as well as the difficulty of centring the point-type spatial filter at the focal point of the spherical lens.

The cylindrical lens 5 makes it possible to effect enlargement of the image only along the x axis on which it is desired to effect the measurement. Along the longitudinal y axis it is instead preferable to be able to have available a wide field of view downstream of the lens 5 (see FIG. 2) in such a way as to have available the greatest possible number of sections of the object in the planes parallel to the xz plane on which to be able to effect the greatest possible number of individual simultaneous measurements. The cylindrical lens achieves this condition, whilst a spherical lens inevitably would enlarge the image in both the x and y directions making possible repeated measurements of the object 4 limited to a section of very modest length.

The light rays 2c, 2d which pass the spatial filter 6 are focused on a photosensitive electronic device 8 disposed in the focal plane B of a further converging lens 7 in such a way that the front focus of this coincides with the rear focus of the cylindrical lens 5 as is known from the geometrical laws of optics. The resultant enlargement is equal to the ratio of the focal lengths of the two lenses.

The light rays which are not deviated along the y direction (FIG. 4) in the passage through the cylindrical lens 5 converge on the focal plane F of the spherical lens 7 on the photo sensitive screen 8. In the example of the wire 4 illustrated in FIGS. 1 and 2, each of the two light beams 2c and 2d which pass the spatial filter 6 are caused to converge at a respective point C, D on the photo sensitive device 8.

Owing to the adoption of a cylindrical lens 5 the resultant image focused on the photosensitive device 8 will, in general, be constituted by n light spots, each corresponding to one of the n rectilinear edges of the object 4, and all aligned along the x axis. The relative distances between the spots C, D are proportional to the real dimensions of the object.

It is important to note that, by virtue of the configuration of the apparatus according to the invention, all the information relating to the whole segment of the edge—extending along the y axis—within the field of view of the apparatus converges contemporaneously and instantaneously in each spot focused on the photosensitive device 8.

In reality the spatial distribution of the luminous intensity detectable in each spot is not a point, but of gaussian type in that it is the integral sum of the individual infinitesimal contributions coming from each point belonging to an edge of the object 4, taken along the y axis across the field of view.

The intensity and extent of this gaussian distribution is indicative of the degree of uniformity of the contribution provided by the various points of a section of the edge of the object 4 which is being measured. These parameters detect if in the section under observation there are defects or irregularities in the outline of the object 4.

The apparatus according to the invention can conveniently be utilised to effect measurements on an object in motion, for example measuring the diameter of a wire 4 which advances along the longitudinal y axis. It should be noted that the total time used by a suitable electronic unit for the conversion of the light image into signals (digital or analogue) and for processing them, although short, is not zero. To ensure that the measurement of an object 4 in movement along the Y axis is continuous, or rather that all the points of the profile of the object have been processed, excluding the possibility of non-monitored zones, it is sufficient to obtain that the visual field of the apparatus be equal at least to the distance travelled by the object 4 at its maximum velocity in the overall time taken for conversion and processing of the image.

Due to the simplifications introduced into the optical structure adopted by this invention it is sufficient to use, as photosensitive device 8, an electronic transducer of linear type in that all the information necessary to extract the desired measurements is contained in a series of spots disposed rigorously along a straight line along the x axis.

The electronic transducer 8 is conveniently mounted in a fixed manner on the apparatus.

If the object 4 to be measured is such as to produce on the photosensitive device 8 a single spot (for example in the case of a metal sheet the position of a single edge of which is to be measured with precision), a linear photodiode of PSD (Position Sensing Device) type can be utilised with exceptional results of precision and speed of response.

If, on the other hand, there are two spots (for example to obtain the measurement of the diameter of a wire), or more than two, it is possible to use a CCD (Charge Couple Device) of linear type, able to provide an electrical signal which faithfully represents the spatial distribution of the light image incident on its sensitive surface.

It is intended that the invention be not limited to the embodiments described and illustrated here, which is to be considered as an example of the measurement apparatus of the invention. The invention is, on the other hand, susceptible of modifications relating to form, disposition and number of components of the apparatus, as well as the constructional and functional details.

The invention claimed is:

1. Apparatus for measuring an object (4) having at least one essentially rectilinear outline or edge (4a, 4b), parallel to a given direction (y), the apparatus comprising:
   a laser source (1) capable of emitting radiation (2, 2a) which impinges on the at least one edge or outline (4a, 4b);
   first converging lens means (5) disposed downstream of the object (4) and comprising at least one cylindrical lens (5) with its directrices parallel to the given direction (y),
   spatial filter means (6) disposed in the focal plane (A) of the first converging lens means (5);
   second converging lens means (7) disposed downstream of the spatial filter means (6);
   photosensitive means (8) disposed in the focal plane (F) of the second converging lens means (7);
   characterised in that the spatial filter means (6) comprise an element essentially in the form of a wire or bar elongated in a direction parallel to the said given direction (y).

2. Apparatus according to claim 1, characterised in that the laser source (1) comprises a laser diode.

3. Apparatus according to claim 2 characterised in that the said laser diode is a low power laser diode.

4. Apparatus according to claim 1, characterised in that the said photosensitive means (8) comprise at least one linear photodiode of PSD type orientated along a direction (x) perpendicular to the said given direction (y).

5. Apparatus according to claim 1, characterised in that the said photosensitive means (8) comprise at least one linear CCD transducer orientated along a direction (x) perpendicular to the given direction (y).

* * * * *